(12) United States Patent
Faham et al.

(10) Patent No.: US 8,316,578 B2
(45) Date of Patent: Nov. 27, 2012

(54) BEDBUG TRAP

(75) Inventors: Mitchell Faham, Brooklyn, NY (US);
Scott Soltis, North Plainfield, NJ (US)

(73) Assignee: Boundless Innovations, LLC, New York, NY (US)

( * ) Notice: Subject to any disclaimer, the term of this patent is extended or adjusted under 35 U.S.C. 154(b) by 158 days.

(21) Appl. No.: 12/769,708

(22) Filed: Apr. 29, 2010

(65) Prior Publication Data

US 2011/0041385 A1 Feb. 24, 2011

(51) Int. Cl.
*A01M 1/10* (2006.01)
*A01M 1/14* (2006.01)
*A01M 1/02* (2006.01)

(52) U.S. Cl. ............... 43/123; 43/114; 43/107; 43/121

(58) Field of Classification Search ............ 43/123, 43/114, 107, 121
See application file for complete search history.

(56) References Cited

U.S. PATENT DOCUMENTS

| | | | |
|---|---|---|---|
| 4,031,654 A | 6/1977 | Gray | |
| 4,217,722 A * | 8/1980 | McMullen | 43/114 |
| 4,998,376 A | 3/1991 | Scherabak | |
| 5,042,194 A | 8/1991 | Cohen | |
| 5,090,153 A | 2/1992 | Mullen et al. | |
| 5,157,866 A * | 10/1992 | Rosie | 43/121 |
| 5,771,628 A | 6/1998 | Nobbs | |
| 5,979,108 A * | 11/1999 | Adams | 43/121 |
| 6,478,440 B1 * | 11/2002 | Jaworski et al. | 362/96 |
| 6,594,947 B2 | 7/2003 | Lingren et al. | |
| 6,625,922 B1 | 9/2003 | Ernsberger, IV | |
| 7,318,653 B2 * | 1/2008 | Chien | 362/95 |
| 7,591,099 B2 | 9/2009 | Lang et al. | |
| 7,743,552 B2 * | 6/2010 | Borth et al. | 43/131 |
| 2003/0184442 A1 | 10/2003 | Gardner, Jr. et al. | |
| 2008/0148624 A1 * | 6/2008 | Borth et al. | 43/131 |
| 2011/0078942 A1 * | 4/2011 | Larsen | 43/113 |
| 2011/0138678 A1 * | 6/2011 | Smith | 43/107 |

FOREIGN PATENT DOCUMENTS

JP 2011254746 A * 12/2011

OTHER PUBLICATIONS

Gentrol Point Source®, Zoecon Professional Products, product description, available at http://www.zoecon.com/gentrolpointsource.htm, downloaded Mar. 17, 2010.

* cited by examiner

*Primary Examiner* — Darren W Ark
*Assistant Examiner* — Kathleen Iwasaki
(74) *Attorney, Agent, or Firm* — Gordon & Jacobson, PC

(57) ABSTRACT

An device for attracting and capturing an insect is provided. The device includes a housing which defines an interior space and a plurality of entrances in open communication with the interior space, a downwardly sloping panel coupled to and disposed within the housing, and an adhesive attached to at least a portion of the bottom surface of the downwardly sloping panel. The downwardly sloping panel and the housing together define a tapering passageway which leads to a crevice opposite at least one of the plurality of entrances, and the adhesive attached to the bottom surface of the panel is adapted to capture the insect.

18 Claims, 6 Drawing Sheets

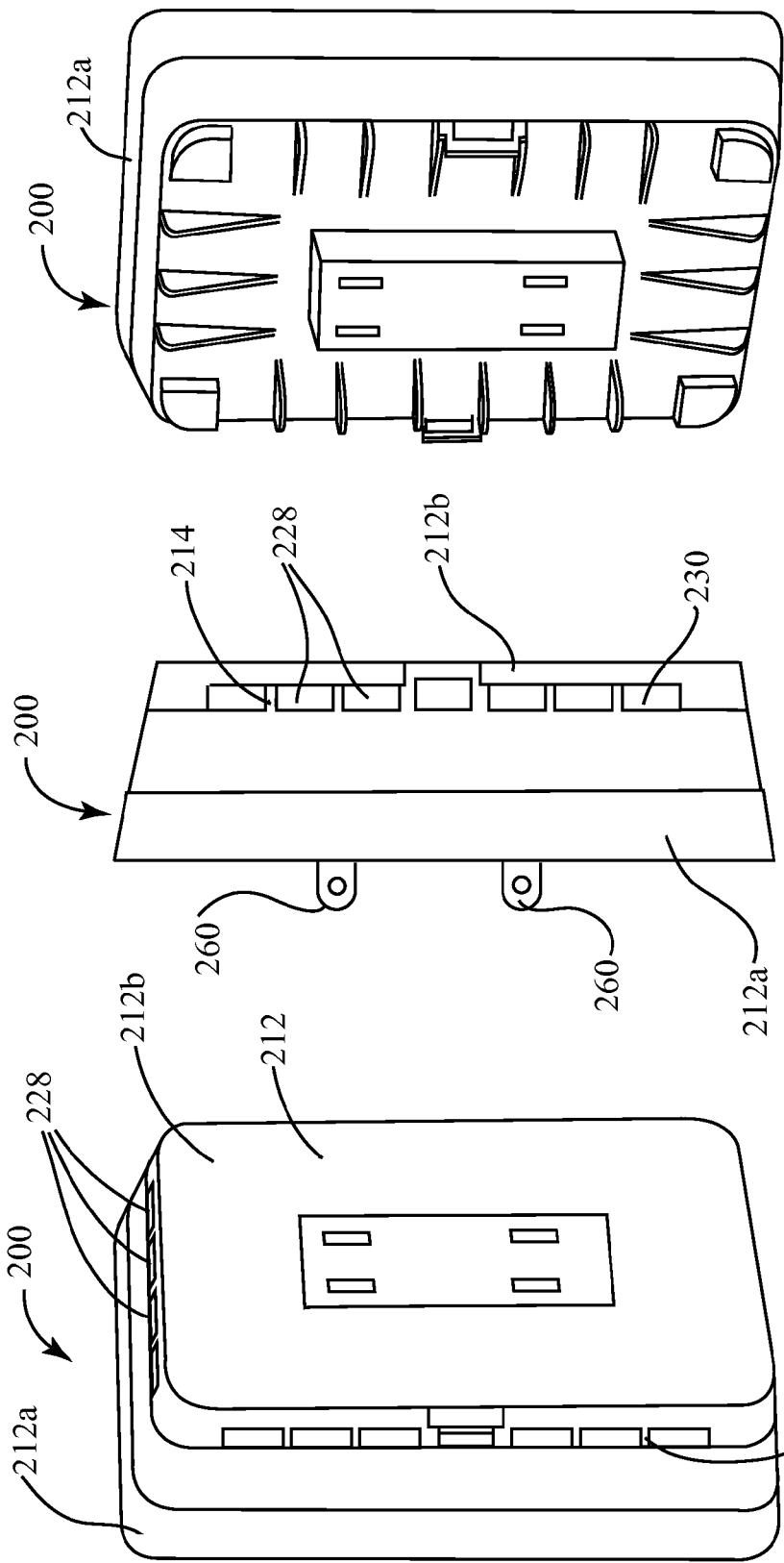

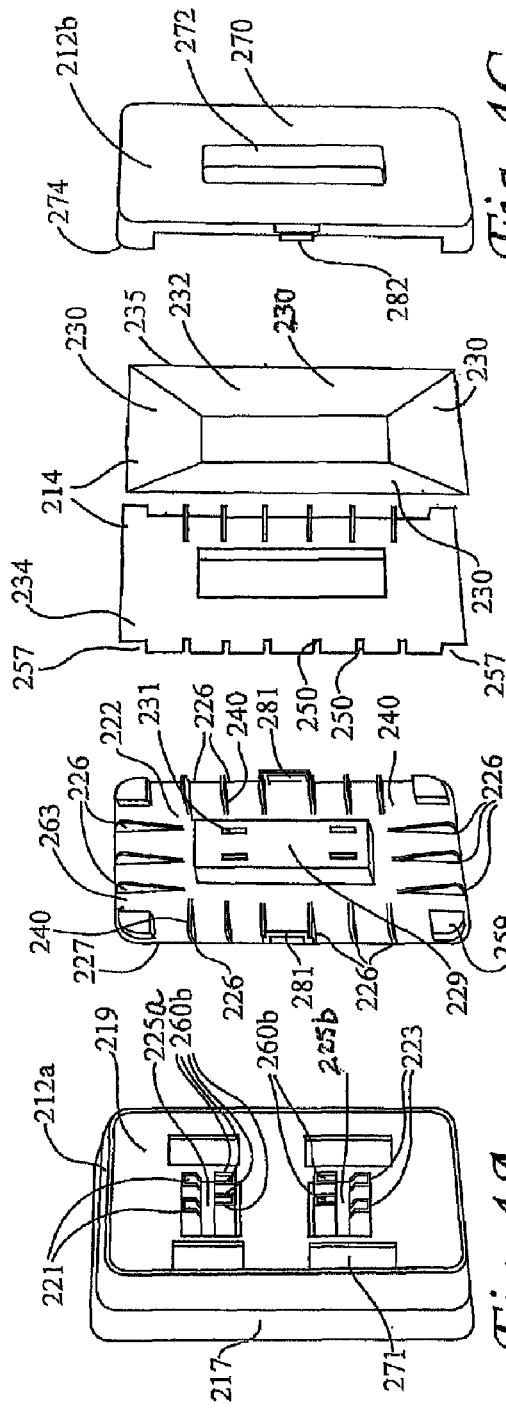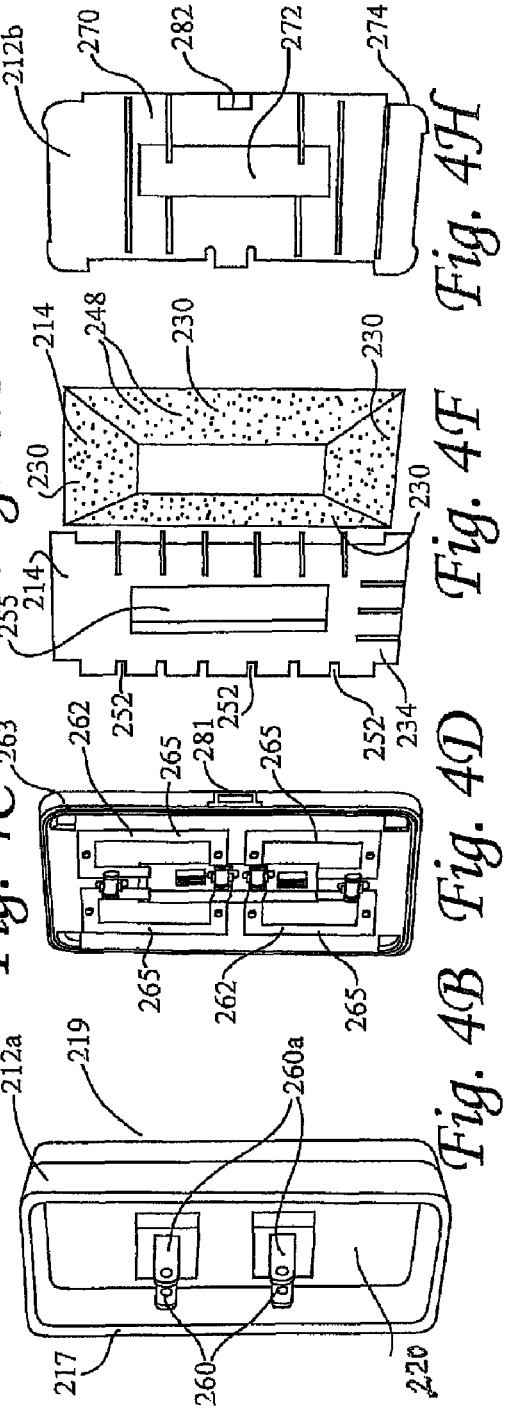

BEDBUG TRAP

BACKGROUND OF THE INVENTION

1. Field of the Invention

This invention relates broadly to insect capturing devices. More particularly, this invention relates to an insect trap for capturing and detecting bedbugs.

2. State of the Art

In the United States, the pest control industry includes over 10,000 companies and provides over seven billion dollars in services annually. One particularly elusive pest for which the industry's services are frequently sought is the bedbug. Bedbugs are small, parasitic insects of the family Cimicidae. Their nickname comes from their preferred habitats, which include houses, beds or other common areas where people sleep and dwell, such as hospitals, cruise ships, movie theaters, airplanes, etc. While bedbugs were largely eradicated in the United States in the early 1940s, they have grown in number over the past decade to near epidemic proportions. Bedbug infestation treatments can cost $300 per room or more. The cost to eliminate a large infestation can be large.

Bedbugs live strictly by feeding on the blood of humans and other warm-blooded animals. They pierce the skin of their host with two hollow tubes, one of which contains anti-coagulants and anesthetics, which makes the bites difficult to detect, the other of which withdraws blood from the host. Bedbugs are typically active at night, just before dawn, and often reach their host by crawling and climbing walls. After feeding for about five minutes, they return to their hiding places. Early detection of bedbugs is difficult on account of their small size, propensity for nocturnal activity, and choice of inconspicuous dwellings during the day, such as wall outlets. Thus, the presence of just a few bedbugs in a particular room or location can quickly grow into an infestation, especially in large homes and hotels.

Bedbugs are attracted by warmth, carbon dioxide, and movement. A number of devices presently known in the art use heat, $CO_2$, moisture, and/or other chemicals to lure, trap, and kill bedbugs. The use of such devices can be dangerous when used for traveling or in homes with children. Canine scent detection has also been utilized, but this method is very expensive, prone to failure and false positives, and is not readily available.

SUMMARY OF THE INVENTION

The invention is directed to an apparatus for attracting and capturing an insect. An embodiment of the apparatus includes a cartridge having at least one sloping panel and an adhesive applied to a bottom surface of the sloping panel for capturing the insect. The cartridge has a bottom support surface and a plurality of side supports extending away from the bottom support surface and defining a plurality of entrances to the cartridge. In one embodiment, an outer housing may be provided for supporting the cartridge. The cartridge is preferably insertable into and removable from the outer housing. The outer housing includes a top surface, a bottom surface, and posts or supports extending between the top and bottom surfaces.

Preferably, the cartridge includes first, second, third, and fourth panels. The first, second, third, and fourth panels extend between respective first ends located adjacent corresponding first, second, third, and fourth groups of entrances to the cartridge, to respective opposite ends disposed adjacent a bottom support surface of the cartridge. The opposite ends of the panels and the bottom support surface of the cartridge together define crevices opposite the first, second, third, and fourth groups of entrances. The panels and crevices give the appearance of cave-like tapering passageways within the cartridge which attract an insect such as a bedbug into the cartridge through one of the entrances.

The adhesive is applied to the bottom surface of each of the panels, at least at the opposite ends located adjacent the crevices, and optionally along the entire bottom surfaces. The adhesive allows for capture of an upper portion of an insect as the insect moves between the panel and the bottom support surface. For example, as the insect advances toward a particular crevice, the distance between the corresponding panel and the bottom support surface decreases, and the upper portion (e.g., the back) of the insect will eventually touch the adhesive on the bottom surface of the panel and stick thereto. In this manner, the apparatus may be periodically inspected to determine whether bedbugs can be found at or near the area in which the apparatus is placed.

In one embodiment, the entire cartridge may be replaceable by an identical cartridge which is also insertable into the outer housing.

According to one aspect of the invention, the apparatus optionally includes a heating element disposed within or adjacent the housing or cartridge for heating the adhesive, thereby softening or melting the adhesive and releasing moisture, and/or for heating the housing and entranceways therein to further attract a bedbug.

According to another aspect of the invention, at least one of a lure, a bait, and an insecticide can be provided on and within the housing and/or cartridge for further attracting and/or killing the bedbug.

According to yet another aspect of the invention, the apparatus may be mounted to a standard wall outlet and is capable of mechanically and electrically coupling the plug of an appliance to the wall outlet.

Additional objects and advantages of the invention will become apparent to those skilled in the art upon reference to the detailed description taken in conjunction with the provided figures.

BRIEF DESCRIPTION OF THE DRAWINGS

FIG. 3A is a front perspective view of a third embodiment of the invention in which the apparatus is attachable via prongs into a standard wall outlet and defines a secondary outlet for receiving prongs of an appliance.

FIG. 3B is a side view of the apparatus of FIG. 3A.

FIG. 3C is a front perspective view of the apparatus of FIG. 3A without the panels or front cover.

FIG. 4A is a front perspective view of the base of the outer housing of FIG. 3A.

FIG. 4B is a rear perspective view of the base of the outer housing of FIG. 4A.

FIG. 4C is a front perspective view of a heating element and support element.

FIG. 4D is a rear perspective view of the heating element and support element of FIG. 4C.

FIG. 4E is an exploded front perspective view of the cartridge of FIG. 3A.

FIG. 4F is an exploded rear perspective view of the cartridge of FIG. 4E.

FIG. 4G is a front perspective view of the front cover of the outer housing of FIG. 3A.

FIG. 4H is a rear perspective view of the front cover of the outer housing of FIG. 3A.

DETAILED DESCRIPTION OF THE PREFERRED EMBODIMENTS

Figure 1:
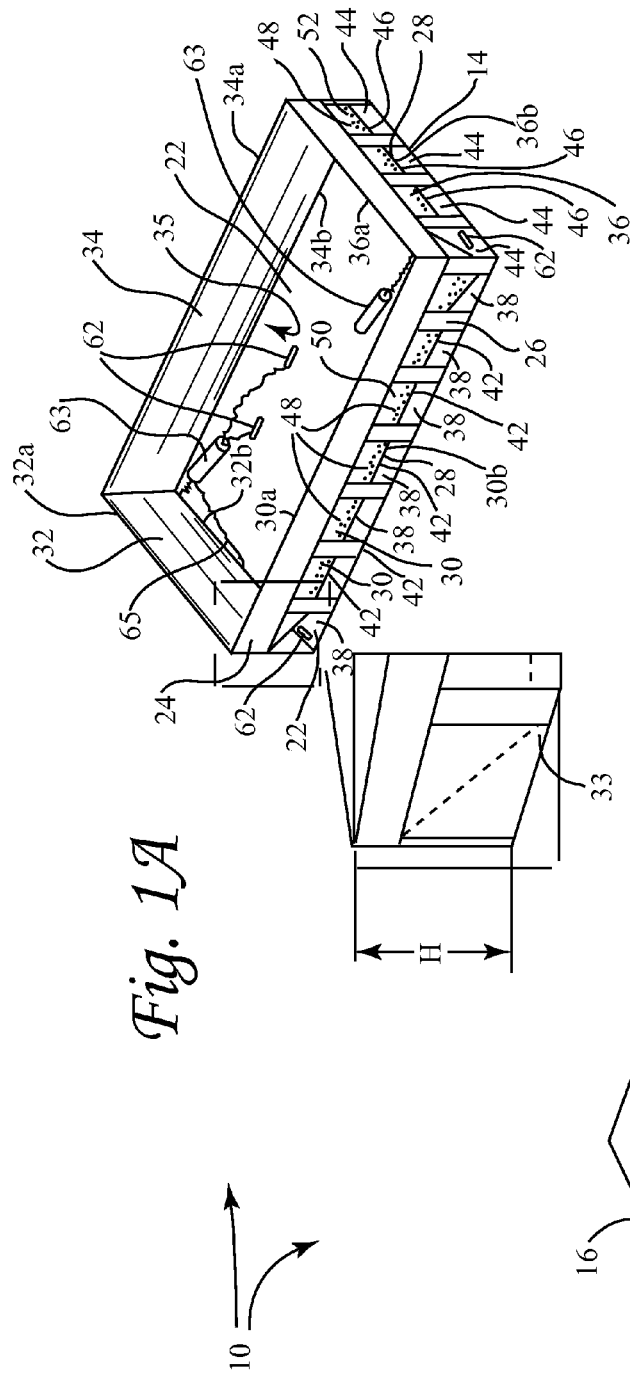
FIG. 1A is a perspective view of a cartridge according to a first embodiment of the invention.
FIG. 1B is a perspective view of an outer housing according to the first embodiment of the invention.

Turning now to FIGS. 1A and 1B, an apparatus 10 for attracting and capturing an insect is shown. The apparatus 10 includes an outer housing 12 which defines an interior space 13, and a cartridge 14 which is insertable into the interior space 13 of the housing 12. The outer housing 12 includes a top surface or wall 16, a bottom surface or wall 18, and posts or supports 20 extending between the top surface 16 and bottom surface 18, and disposed at corners of the outer housing 12. The cartridge 14 is slidable into the outer housing 12 between the supports 20, and between the top and bottom surfaces 16, 18. The top surface 16 of the outer housing 12 is preferably offset from the bottom surface 18 by a distance which is approximately equal to the height (H) of the cartridge 14 such that the cartridge 14 nests in the outer housing 12 and does not easily fall out of it.

The cartridge 14 has a bottom support surface 22, an upper sidewall 24 offset from the bottom support surface 22, and a plurality of supports or posts 26 extending between the bottom support surface 22 and the upper sidewall 24 around the perimeter of the cartridge 14. The plurality of side supports 26 of the cartridge 14 define a plurality of entrances 28 around the periphery of the cartridge 14 which, when the cartridge 14 is disposed inside the outer housing 12, are in open communication with the interior space 13 of the housing 12.

First, second, third, and fourth panels 30, 32, 34, 36 are integrally formed with the upper sidewall 24 of the cartridge 14. Alternatively, the panels 30, 32, 34, 36 may be attached to the upper sidewall 24 using various types of adhesives, hooks, hooks and fasteners, or any other suitable fastener. In this manner, each of the panels 30, 32, 34, 36 may be removable from the cartridge 14 and replaceable by an identical or similar panel.

As shown in FIG. 1A, the panels 30, 32, 34, 36 slope downward within the cartridge 14. The first panel 30 slopes downward within the cartridge 14 from one end 30a integral with or attached to the upper sidewall 24 away from a first group 38 of the entrances 28 to an opposite end 30b at or adjacent the bottom support surface 22 of the cartridge 14. The opposite end 30b of the first panel 30 and the bottom support surface 22 of the cartridge 14 together define a first crevice 42 opposite the first group 38 of the plurality of entrances 28. The first group of entrances 38, the downwardly sloping first panel 30, and the first crevice 42 together give the appearance of a cave-like tapering passageway which attracts an insect such as a bedbug into the cartridge 14 through one of the first group of entrances 38.

The second panel 32 slopes downward within the cartridge 14 from one end 32a integral with or attached to the upper sidewall 24 away from a second group (hidden) of entrances to an opposite end 32b at or adjacent the bottom support surface 22 of the cartridge 14. The opposite end 32b of the second panel 32 and the bottom support surface 22 of the cartridge 14 together define a second crevice 33 opposite the second group of entrances.

The third panel 34 slopes downward within the cartridge 14 from one end 34a integral with or attached to the upper sidewall 24 away from a third group (hidden) of entrances to an opposite end 34b at or adjacent the bottom support surface 22 of the cartridge 14. The opposite end 34b of the third panel 34 and the bottom support surface 22 of the cartridge 14 together define a third crevice 35 opposite the third group (hidden) of entrances.

The fourth panel 36 slopes downward within the cartridge 14 from one end 36a integral with or attached to the upper sidewall 24 away from a fourth group 44 of entrances to an opposite end 36b at or adjacent the bottom support surface 22 of the cartridge 14. The opposite end 36b of the fourth panel 36 and the bottom support surface 22 of the cartridge 14 together define a fourth crevice 46 opposite the third group (hidden) of entrances. In all four cases, the crevices 42, 33, 35, 46 may be open or closed. More particularly, if a particular panel touches the bottom support surface 22, the crevice formed will be closed. If the particular panel is adjacent and not touching the bottom support surface, then the crevice formed will be open.

It will be appreciated that when the cartridge 14 is placed inside of the outer housing 12, the plurality of entrances 28 of the cartridge 14 will each appear cave-like to a bedbug on all four sides of the outer housing 12 as overhead light will be shielded by the top surface 16 of the outer housing 12, as well as by each of the panels 30, 32, 34, 36, rendering the crevices formed between the bottom support surface 22 of the cartridge 14 and the panels 30, 32, 34, 36 relatively dark.

Adhesive 48 is preferably attached to the bottom surface 50 of the first panel 30, the bottom surfaces (hidden) of the second and third panels 32, 34, and the bottom surface 52 of the fourth panel 36, preferably in the areas at or adjacent the crevices formed between the panels 30, 32, 34, 36 and the bottom support surface 22 or along the entire bottom surfaces. The adhesive 48 may be of any standard type known in the art typically used for catching the legs of a small insect like a bedbug.

It will be appreciated that as the insect moves under one of the downwardly sloping panels 30, 32, 34, 36 toward one of the corresponding ends 30b, 32b, 34b, 36b and one of the corresponding crevices (e.g., 33, 35, 42, 46), the back of the insect (as opposed to its legs) will touch and get stuck on the adhesive 48 on the bottom surface of the respective panel. For example, as an insect advances through one of the first group of entrances 38 toward the first crevice 42, the distance between the first panel 30 and the bottom support surface 22 decreases, and the upper portion (e.g., the back) of the insect or bedbug will eventually touch the adhesive 48 on the bottom surface 22 of the downwardly sloping first panel 30, and stick thereto. As bedbugs are generally very cautious, they usually do not get caught in glue traps. Their antennas sense what is on the floor in front of them at all times. By placing the adhesive on the bottom surface of the downwardly sloping panel, which will be disposed above the bedbug, the adhesive will catch the most vulnerable part of the bedbug—its back. In this manner, the apparatus 10 may be placed anywhere where a user wishes to test for bedbugs, and periodically inspected to determine whether bedbugs have in fact arrived or congregated at or near the area in question and been trapped by the cartridge 14.

According to one aspect of the invention, the panels 30, 32, 34, 36 may be permanently fixed to the cartridge 14 and the cartridge 14 may be replaceable in the outer housing 12 by an identical or similar cartridge. According to another aspect of the invention, the panels 30, 32, 34, 36 may be removable from and replaceable within a given cartridge 14. It will be appreciated that cartridges may also be utilized which contain less than four panels or more than four panels, that the cartridge 14 may be provided permanently fixed inside of the outer housing 12 and/or without the bottom support surface 22. For example, if the cartridge 14 of FIG. 2 is provided without the bottom support surface 22, and the panels 30, 32, 34, 36, upper sidewall 24, and side supports 26 are fastened together by glue, adhesive, staples, or other fastener(s), then when the cartridge 14 is inserted into the outer housing 12, the bottom surface 18 of the outer housing 12 functions as the bottom support surface, and the panels and bottom surface 18 will together form crevices opposite respective entrances in the housing as discussed above.

The apparatus 10 may also be utilized without the outer housing 12. While the outer housing 12 provides structural support to the cartridge 14 and helps to block overhead light, overhead light is also blocked by the downwardly sloping panels 30, 32, 34, 36 of the cartridge 14 which cover the respective crevices, and the crevices will be relatively dark even without the outer housing 12. The entire apparatus 10 may be made from cardboard, plastic, or any other suitable materials.

The apparatus 10 may also optionally include one or more heating elements 62 disposed within the cartridge 14 (e.g. at the corners or center as shown in FIG. 1). The heating element 62 may be supported by the bottom support surface 22 or by the outer housing 12. The heating element 62 may be strip which extends around the perimeter of the cartridge 14 or housing 12, or may be disposed in a single, preferably centralized location of the cartridge 14 or housing 12. The heating element 62 warms the interior of the outer housing 12 and cartridge 14, which further attracts insects such as bedbugs. When activated, the heating element 62 may also be used to warm (and soften) the adhesive 48 attached to the panels. For example, if the adhesive 48 is glue, then activation of the heating element 62 may warm the glue to a temperature sufficient to soften it, thereby making it sticky and causing it to release moisture. The moist heat resulting from the heating element 62 and the softened adhesive 48 will further attract a bedbug into the apparatus 10. Standard heater devices known in the art may be utilized, such as, for example, a heating coil, a heat lamp, or any other device which converts electrical energy into thermal energy. The heating element is in electrical communication with a power supply such as a battery 63 or electrical outlet (not shown) via wires 65.

Figure 2:
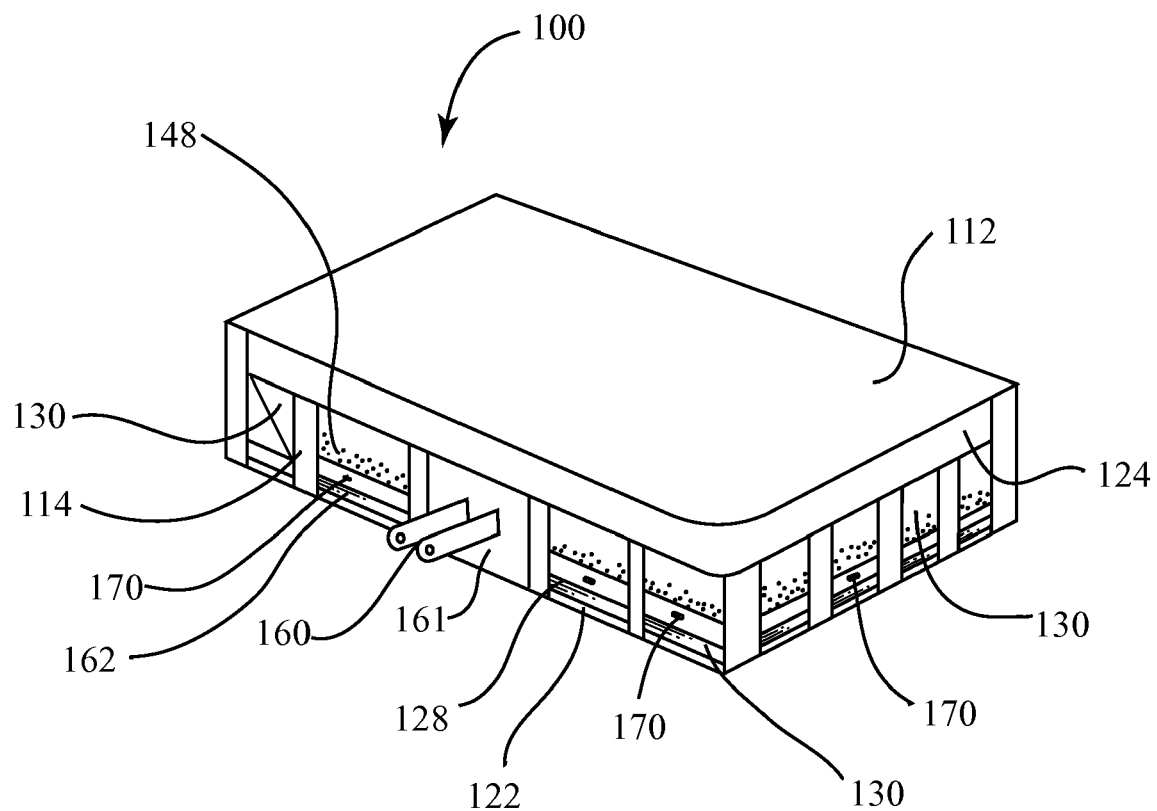
FIG. 2 is a perspective view of a second embodiment of the invention in which the apparatus is equipped with a heating strip and a plug which is insertable into a standard wall outlet.

Turning to FIG. 2, an apparatus 100 similar to the apparatus 10 is shown. A cartridge 114 is assembled inside an outer housing 112 and defines a plurality of entranceways 128. Panels 130 extend downward within the apparatus 100 from an upper sidewall 124 toward a support surface 122. The outer housing 112 is provided with a pair of prongs 160 which electrically couple to (and mechanically mount the apparatus 100 to) a standard electrical outlet (not shown). The mount 161 which supports the prong may be a 90° swivel mount so that the apparatus 100 can assume different positions. In a first position, when the apparatus 100 is plugged into a wall outlet, the apparatus 100 will remain level (e.g. parallel to the ground), and the entrances 130 on the side of the prongs 160 will face the outlet such that a bedbug exiting the outlet will quickly encounter the entrance 130 and proceed through it. In a second position, the apparatus 100 is rotated by 90° such that the support surface 122 will be adjacent the wall.

A heating element 162 is provided which is in electrical communication with the prongs 160 via electrical wires and/or terminals (not shown). The heating element 162 is mounted to the support surface 122, and may be a strip which extends around the perimeter of the apparatus 100, or may be disposed in a single, preferably centralized location. The heating element 162 warms the interior of the outer housing 112 and internal cartridge 114, which further attracts insects such as bedbugs. When activated, the heating element 162 may also be used to warm (and soften) adhesive 148 attached to the panels 130. For example, if the adhesive is glue, then activation of the heating element 162 may warm the glue to a temperature sufficient to melt it, thereby making it sticky and causing it to release moisture. The moist heat resulting from the heating element 162 and the melting adhesive 148 will further attract a bedbug into the apparatus 100. Standard heater devices known in the art may be utilized, such as, for example, a heating coil, a heat lamp, or any other device which converts electrical energy into thermal energy.

Other chemicals 170, such as a lure, a bait, and/or an insecticide may be provided within the apparatus 100 for further attracting and/or killing a bedbug.

The apparatus has overall dimensions ranging from a preferable minimum size of two inches by three inches by one-half inch to a maximum size of twelve inches by eighteen inches by four inches.

Figure 5A:
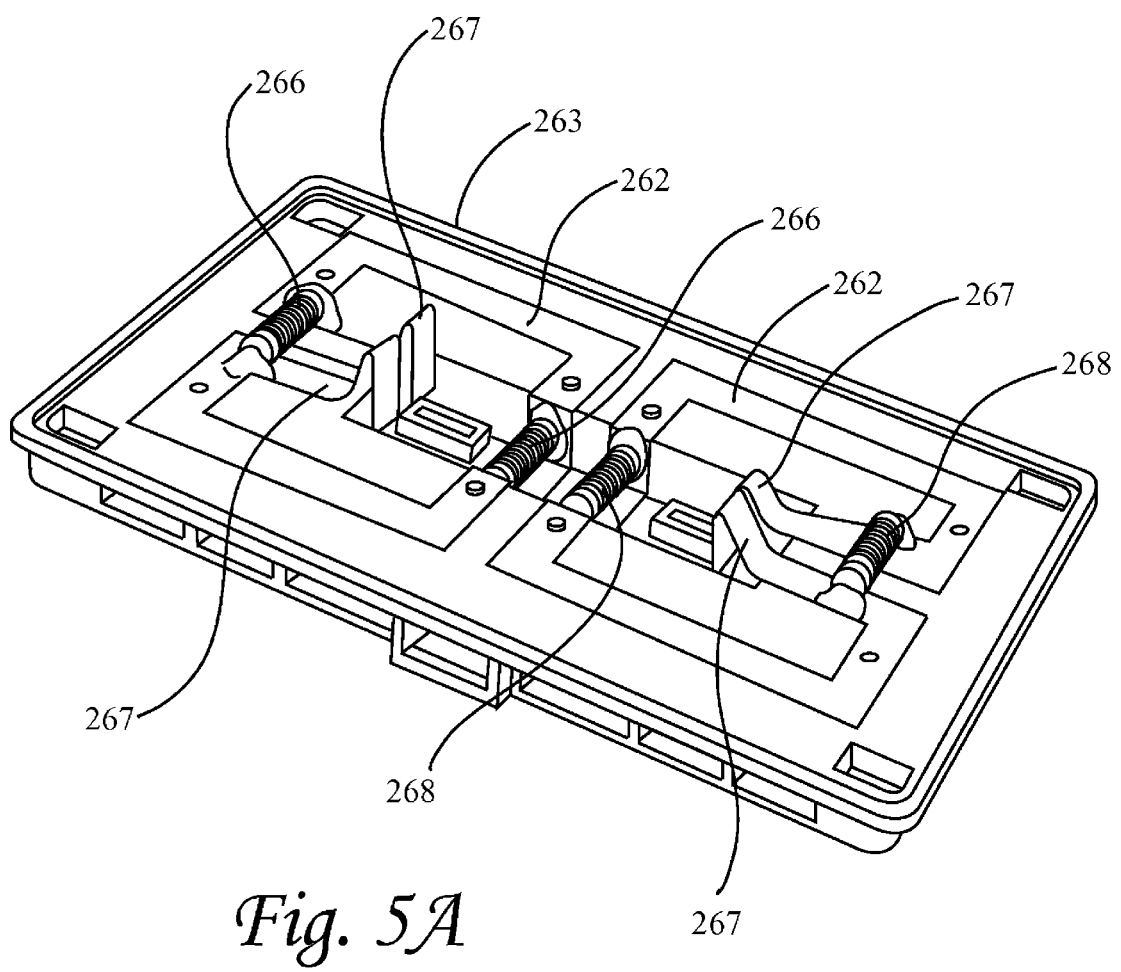
FIG. 5A is a top perspective view of the heating element and support element of FIG. 4D.

Turning to FIGS. 3A-3C, an apparatus 200 similar to the apparatus 10 and the apparatus 100 is shown. The apparatus 200 includes an outer housing 212 which has a base 212a and a front cover 212b. A cartridge 214 assembled inside the outer housing 212 defines a plurality of entranceways 228. The base 212a of the outer housing 212 supports a pair of rearwardly extending prongs 260 which electrically couple to and mechanically mount the apparatus 200 to a standard electrical outlet (not shown). A support element 263 which includes a heating element 262 (FIGS. 4D, 5A, 5B) is provided between the base 212a and the cartridge 214. Support element 263 also provides female electrical ports 231 which are described below. In the assembled configurations of FIGS. 3A-3C, the heating element 262 is in electrical communication with the prongs 260.

Turning to FIGS. 4A-4B, the base 212a of the outer housing 212 includes a preferably foam rubber rear backing (e.g., an insulator) 217 attached to a front section 219 which is preferably made from hard plastic. The front section 219 supports the prongs 260, which extend therethrough and rearwardly away from the front section 219. The rear ends 260a of the prongs 260 are standard for connecting to an outlet. The front ends 260b of the prongs 260 are bifurcated and springy to provide a port for standard prongs of another electrical element (not shown) to be received therein. The foam rubber rear backing 217 also extends rearwardly away from the front section 219 and defines an internal space 220 for receiving the typically rectangular outer facade of a standard wall outlet as the prongs 260 are entered into the wall outlet (not shown). The front plastic section 219 also defines extensions 221, 223 which define upper and lower slots for guiding electrical prongs of another electrical element (not shown) into prong ends 260b. Between extensions 221, 223 and the bifurcated prongs 260b, yet additional slots 225a, 225b are provided for receiving the leads from the heating element 262 (further discussed below).

Turning to FIGS. 4C-4D and 5A-5B, the heating element 262 and support element 263 are preferably constructed to supply heat relatively uniformly to the apparatus 200. The heating element 262 has four stamped copper strips 265, each oriented in a rectangular path around a respective quadrant of the rear surface of the support element 263. The top two copper strips are connected by two resistive elements 266 which serve to help heat the unit to the proper temperature. The bottom two copper strips are similarly connected by two resistive elements 268 which serve to help heat the unit to the proper temperature and which are chosen accordingly. Preferably, the unit is heated to a temperature of between 100° F. and 115° F., although other temperatures could be utilized. If desired, a thermal sensor and circuit breaker could be utilized to prevent the unit from heating up beyond its desired temperature; i.e., a more complex circuit can readily be provided by one skilled in the art to meet all standards' requirements. According to one aspect of the invention, each copper strip 265 is electrically coupled to a lead 267 which is preferably springy and which extends out of the plane of the copper strips 265. The leads 267 of the copper strips 265 extend into the upper and lower slots 225a, 225b (FIG. 4A) of the front section 219 of the base 212a of the outer housing 212 such that they contact the bifurcated prongs 260b supported by the base 212a. In this manner, the heating element 262 is electrically coupled to the prongs 260 and directly connected to a power source when the apparatus 200 is inserted into a standard wall outlet.

Figure 5B:
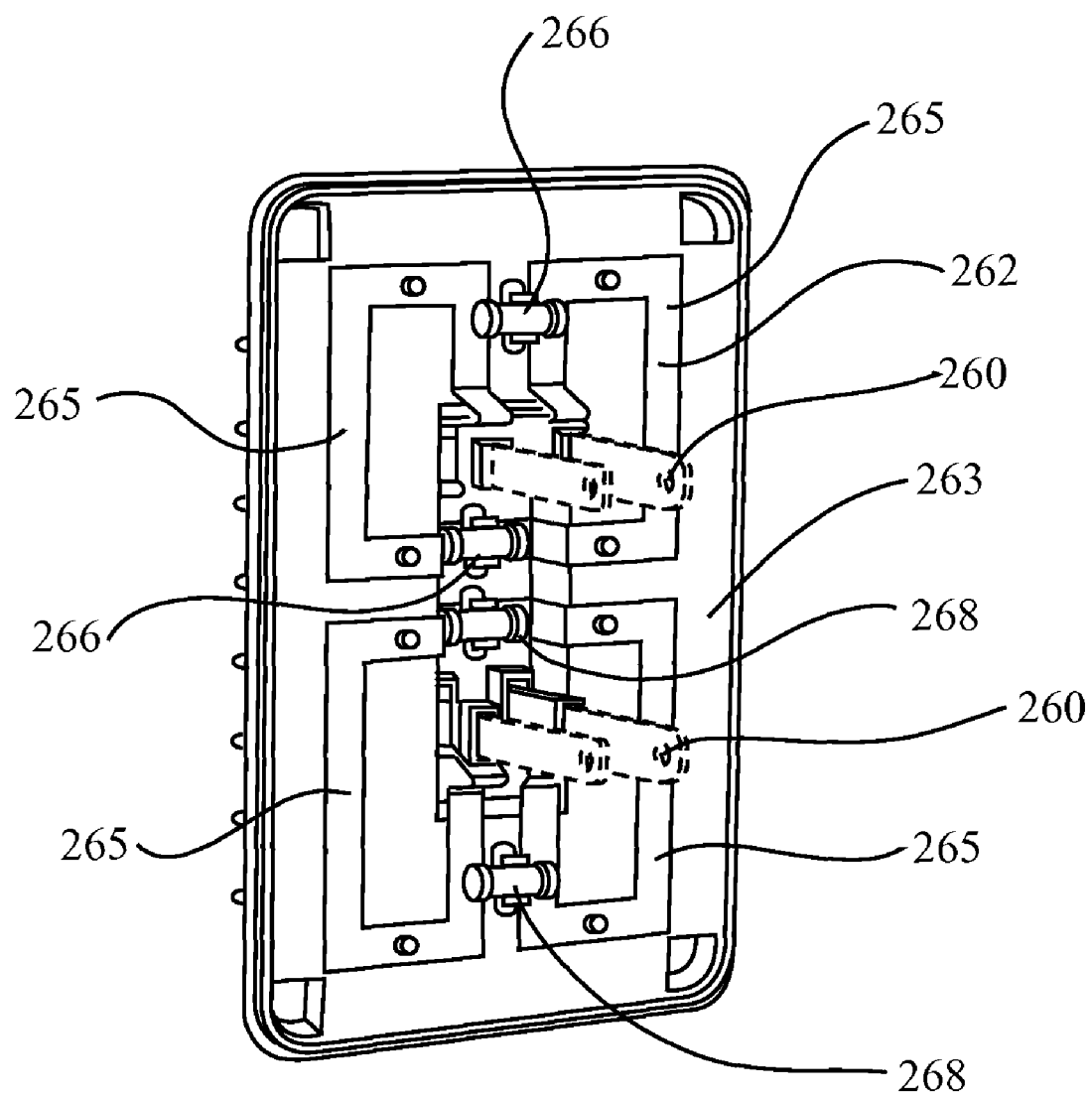
FIG. 5B is an rear perspective view of the heating element of FIG. 4D coupled to the prongs, shown in broken lines, of FIG. 4A.

As shown in FIG. 4C, the front side of the support element 263 has a bottom support surface 222 and a plurality of angled side supports 226 around the perimeter of the bottom support surface 222 and extending away from the bottom support surface 222. The side supports 226 extend from respective first ends at the edge 227 of the bottom support surface 222 to respective second ends offset from the edge 227. The side supports 226 have sloped top surfaces 240 which are most offset from the bottom support surface 222 at their respective first ends (at edge 227), and least offset from the bottom support surface 222 at their respective second ends, which are preferably disposed at or adjacent the bottom support surface 222. The plurality of side supports 226 define the plurality of entrances 228 as shown in FIG. 3B. The front side of the support element 263 also defines an offset centralized portion 229 which has slots 231 for receiving prongs of an appliance (not shown), and corner posts 259 for assisting with assembly of the apparatus 200. The prongs of another electrical element such as an appliance may thus be inserted through the slots 231 such that they extend into the bifurcated prongs 260b of the front portion 219 of the base 212a such that the prongs of the appliance are electrically coupled to the prongs 260 of the apparatus 200. The prongs 260 are shown in FIG. 5B with broken lines as they are supported by and extend through the base 212a, which is not shown in FIG. 5B. The front side of the support element 263 further defines at least one catch element 281 (two shown) which is designed to capture a latch 282 of the front cover 270, described with reference to FIGS. 4G and 4H. The entire support element 263 is preferably press fit into the front section 219 of the base 212a with the spring leads 267 held in the slots 225a, 225b. The support element 263 is pressed into the front side of the base until the rear side of the support element 263 reaches the spacers 271.

Turning to FIGS. 4E-4F, the cartridge 214 includes sticky pad 232 and optional plastic floor cover 234. The sticky pad 232 includes slanted or sloped panels 230 which angle downward from first ends at an edge 235 of the outer perimeter of the sticky pad 232 toward second ends offset from the edge 235. The sticky pad 232 preferably contains an adhesive 248 applied to the lower surface of each of the panels 230. When the sticky pad 232 is placed on the front side of the support element 263, the panels 230 lie flush with the top surfaces 240 of the plurality of side supports 226 to further define the plurality of entranceways 228. It will be appreciated that without the plastic floor cover 234, the front side of the support element 263 functions as the support surface on which the bedbug will likely walk, and the panels 230 function to block light, thus creating a dark channel which attacts the bedbug. The panels 230 and the bottom support surface (front side of the support element 263) form crevices similar to the crevices of apparatus 10 and apparatus 100. The adhesive 248 is preferably applied to the bottom surfaces of the panels 230 at or near the crevices.

Alternatively, the optional plastic floor cover 234 may be placed over the front side of the support element 263 and sticky pad 232 placed over the floor cover 234. As shown, the floor cover 234 defines side supports 250 which are substantially the same as the side supports 226 of the support element 263 on the front side and which also defines slots 252 at the rear thereof. The slots 252 receive the plurality of side supports 226 of the support element 263. The floor cover 234 also defines a center hole 255 for receiving the centralized portion 229 of the front side of the support element 263, and corner notches 257 for receiving the corner posts/elements 259 extending from the front side of the support element 263. The floor cover 234 may be used to help prevent adhesive from the sticky pad 232 from being applied to the front side of the support element 263 and/or the fingers of the user. For example, the sticky pad 232 and floor cover 234 may come pre-attached so that the user does not come into contact with the adhesive, and simply removes an old cartridge and presses a new cartridge 214 onto the front side of the support element 263.

The cartridge 214 may also contain an insect growth regulator such as Zoecon$^{(R)}$ applied to the panels 230. Thus, the apparatus 200 may be sold as a kit with one or more cartridges 214, one or more of which contain the insect growth regulator. A cartridge containing adhesive but not insect growth regulator may be used to detect the presence of bedbugs. If bedbugs are detected, then a cartridge containing the insect growth regulator with or without the adhesive may be used to help prevent an infestation from occurring.

As shown in FIGS. 4G-4H, a front cover 270 is optionally provided which attaches to the front of the apparatus 200 for structural and aesthetic purposes. The front cover 270 defines a center hole 272 for receiving the center portion 229 of the front side of the support element 263, and corner elements 274 which align the front cover 270 about corners 259 of the support element 263. Resilient latches 282 are provided to secure the front cover 270 to the support element 263 via catches 281. In this manner, the cover 270 can be easily removed from the apparatus 200 by squeezing the latches 282 and pulling. Once the front cover 270 is removed from the apparatus 200, the cartridge 214 is readily removable, inspectable, and replaceable. It should be noted that the apparatus 200 may be inspected without removing the cover 270 by shining a light through the entrances 228.

Additional objects and advantages of the invention will become apparent to those skilled in the art upon reference to the detailed description taken in conjunction with the provided figures.

There have been described and illustrated herein several embodiments of an apparatus for attracting and capturing an insect. While particular embodiments of the invention have been described, it is not intended that the invention be limited thereto, as it is intended that the invention be as broad in scope as the art will allow and that the specification be read likewise. Thus, while particular sizes, shapes, and dimensions of an outer housing and inner cartridge have been disclosed, it will be appreciated that other sizes, shapes, and dimensions may be used as well. In addition, while particular numbers of panels have been disclosed, it will be understood that different numbers of panels may be utilized or that a single panel may be utilized. Also, while use of a cardboard material is preferred for the panels, it will be recognized that other materials may be utilized. Furthermore, while an outer housing and internal cartridge have been disclosed, it will be understood that the outer housing and internal cartridge function as a single housing in an assembled configuration, and that such a single housing may be permanently provided such that the cartridge is not removable. Moreover, while particular heating elements and adhesives have been disclosed, it will be appreciated that other heating elements and adhesives may be utilized. Also, while it has been described to use the embodiments of the invention sitting on a bed, or plugged into an outlet, it will be appreciated that one or more embodiments of the invention could be used inside a mattress. This could be accomplished by providing a framed opening in the mattress into which the cartridge with or without the housing could be inserted. It will therefore be appreciated by those skilled in the art that yet other modifications could be made to the provided invention without deviating from its spirit and scope as claimed.

What is claimed is:

1. An apparatus for attracting and capturing an insect, comprising:
   a structure;
   a sloping panel coupled to and disposed within said structure, said sloping panel having a bottom surface; and
   an adhesive attached to at least a portion of said bottom surface of said sloping panel and capable of contacting and capturing the insect;
   a plug element supported by said structure, said plug element being adapted to electrically couple and mechanically mount to a wall outlet; and
   a heating element supported by said structure which heats said structure and said adhesive, said heating element includes a lead having a first end adapted to contact said plug element and a circuit coupled to said lead, and said plug element supplying electricity to a second end of said heating element for operation thereof,
   wherein, said structure defines an interior portion and a plurality of entrances to said interior portion, and said sloping panel and said structure define a crevice within said interior portion opposite at least one of said plurality of entrances.

2. The apparatus according to claim 1, wherein:
said apparatus has a length which is no more than eighteen inches and a width no more than twelve inches.

3. The apparatus according to claim 1, wherein:
said lead is a spring lead.

4. The apparatus according to claim 1, wherein:
said heating element is adapted to heat said apparatus to a temperature of between 100 and 115 degrees Fahrenheit.

5. The apparatus according to claim 1, wherein:
said structure includes a housing with a front section made from hard plastic and an insulated rear backing attached to said front section.

6. The apparatus according to claim 5, wherein:
said insulated rear backing is formed from foam rubber.

7. An apparatus for attracting and capturing an insect, comprising:
   a structure;
   a sloping panel coupled to and disposed within said structure, said sloping panel having a bottom surface;
   an adhesive attached to at least a portion of said bottom surface of said sloping panel and capable of contacting and capturing the insect;
   a heating element;
   a plug element supported by said structure, said plug element being adapted to electrically couple and mechanically mount to a wall outlet to supply electricity to said heating element for operation thereof,
   said plug element includes at least two plug prongs, each plug prong including bifurcated elements configured to receive and electrically couple an appliance plug to the wall outlet,
   wherein, said structure defines an interior portion and a plurality of entrances to said interior portion, and said sloping panel and said structure define a crevice within said interior portion opposite at least one of said plurality of entrances.

8. The apparatus according to claim 7, wherein:
said adhesive is glue.

9. The apparatus according to claim 7, wherein:
said heating element includes a spring lead adapted to contact said plug element and a circuit coupled to said spring lead.

10. The apparatus according to claim 7, wherein:
said heating element is adapted to heat said apparatus to a temperature of between 100 and 115 degrees Fahrenheit.

11. The apparatus according to claim 7, wherein:
said structure includes a housing with a front section made from hard plastic and an insulated rear backing attached to said front section.

12. The apparatus according to claim 11, wherein:
said insulated rear backing is formed from foam rubber.

13. A kit, comprising:
   an outer housing having a top surface and a bottom surface;
   a plurality of cartridges which are insertable into and removable from said outer housing, at least one of said cartridges including
   (1) a structure having a bottom support surface and a plurality of side supports extending away from said bottom support surface, said side supports defining a plurality of entrances to said structure,
   (2) a first panel coupled to said structure, said first panel sloping toward said bottom support surface of said structure and away from a first group of said plurality of entrances, said first panel and said bottom support surface defining a first crevice opposite said first group of said plurality of entrances, said first panel having a bottom surface,
   (3) an adhesive attached to at least a portion of said bottom surface of said first panel, said adhesive capable of contacting and capturing an upper portion of an insect when the insect is disposed between said first panel and said bottom support surface of said structure;
   a heating element; and
   at least one plug element supported by said housing, said plug element being adapted to electrically couple and mechanically mount to a wall outlet to supply electricity to said heating element for operation thereof, each said plug element including at least two plug prongs, each plug prong including bifurcated elements configured to receive and electrically couple an appliance plug to the wall outlet.

14. The kit according to claim 13, wherein:
said first panel contacts and covers said first group of said plurality of entrances of said structure.

15. The kit according to claim 13, wherein:
said first panel is adapted to release moisture to attract the insect.

16. The kit according to claim 13, wherein:
said outer housing has a length of no more than eighteen inches and a width of no more than twelve inches.

17. The kit according to claim 13, wherein:
at least one of said cartridges includes an insect growth regulator.

18. The kit according to claim 13, wherein:
said heating element is adapted to heat said apparatus to a temperature of between 100 and 115 degrees Fahrenheit.

* * * * *